Patented Feb. 10, 1942

2,272,728

UNITED STATES PATENT OFFICE 2,272,728

PROCESS FOR IMPARTING BACTERICIDAL AND STERILIZING PROPERTIES TO NATURAL SPONGES

Sam Rosenzweig, New York, N. Y.

No Drawing. Application January 13, 1941, Serial No. 374,206

2 Claims. (Cl. 21—58)

The invention relates to a method of imparting bactericidal and sterilizing properties to products of the genus "Spongia" or to natural sponges and to the products produced by the said method. These sponges are the skeleton of the Spongia animal and contain a considerable percentage of albumin.

It is an object of the invention to produce within the sponge organism bactericidal and sterilizing albumin compounds.

It is a further object of the invention to produce these albumin compounds within the sponge structure in such a manner that they are evenly distributed therein and firmly embedded and fastened in the capillary system of the sponges.

It is a further object of the invention to render the bactericidal and sterilizing sponges resistant to the action of water so that the bactericidal albumin compounds embedded therein are not washed out.

It is a further object of the invention to produce natural sponges which retain their bactericidal properties for their entire period of use.

The invention is based on the recognition that by treating natural albumin containing sponges of the genus "Spongia" with silver or gold salt solutions under certain conditions practically water insoluble silver or gold albumin compounds are created within the capillary fissures and channels of the sponge material which compounds exert a surprisingly high bactericidal effect and retain the same practically unaltered.

With this purpose in view the sponges of the genus "Spongia" which have been cleaned, freed from the gelatinous matter covering the same, and bleached in the customary manner to be used as a commercial article are subjected to the action of an aqueous silver or gold salt solution for a period of several and preferably about 24 hours at a normal room temperature or a slightly elevated temperature of up to 50° C. This treatment is continued until a quantity of silver is absorbed by the sponges which is equal to at least 1% of the dry material. The sponges are then subjected to a water washing treatment. A certain percentage of the absorbed silver which approximately equals 12% of the total silver contents is hereby removed. After a certain period of approximately one hour a constancy is reached of the silver contents which is not changed by further washing.

The manufacture of silver or gold albumin compounds from animal albumin containing materials by various rather complicated methods is known. The thus obtained compounds are more or less soluble in water or watery solutions. Also the bactericidal properties of colloidal silver or gold are well known.

The invention is differentiated over this art by the fact that if treated according to the invention the silver or gold albumin compounds are formed within the capillary channels of the sponge fibres as a water insoluble compound which is finely and evenly distributed throughout the capillary structure of the sponge, firmly held therein and cannot be washed out by water or watery solutions. The colour or appearance of the sponges remains unaltered.

The following example indicates a specified manner of carrying-out my invention; but I do not limit myself to the conditions or proportions set forth, as they may be varied by those skilled in the art to suit the requirements of special use. Instead of silver or gold other metals having oligodynamic properties may be used.

*Example*

100 parts by weight of dry commercial sponges are immersed in 500 parts of a 20% silver nitrate solution and subjected to the action of this solution at ordinary room temperature for a period of approximately 24 hours. The action may be intensified by agitation. After this phase of the treatment is terminated a quantity of silver corresponding to 7% of the weight of the dry sponges has been absorbed.

Hereupon the sponges are washed with water until the silver contents remains constant. When this phase of the treatment is reached the silver contents is 6.2%. Further washing does not change this figure.

I claim:

1. A process for imparting bactericidal and sterilizing properties to natural sponges, comprising subjecting the customarily cleaned sponges to the action of an aqueous silver salt solution until a quantity of silver has been absorbed which is equal to at least 1% of the weight of the dry material, subjecting the sponges to a washing treatment, continuing the latter until a constancy is reached of the silver contents and absorbing hereby the silver as a practically water insoluble silver albumin compound uniformly distributed and firmly held within the capillary fibrous structure of the sponges.

2. A sponge of the genus "Spongia" having bactericidal and sterilizing properties and containing a practically water insoluble silver albumin compound finely distributed and firmly held within its capillary fibrous structure.

SAM ROSENZWEIG.